US012173678B2

(12) United States Patent
Alriksson et al.

(10) Patent No.: US 12,173,678 B2
(45) Date of Patent: Dec. 24, 2024

(54) IGNITION SYSTEM AND METHOD CONTROLLING SPARK IGNITED COMBUSTION ENGINES

(71) Applicant: SEM AB, Åmål (SE)

(72) Inventors: Patrik Alriksson, Åmål (SE); Jörgen Bengtsson, Backen (SE)

(73) Assignee: SEM AB, Amal (SE)

( * ) Notice: Subject to any disclaimer, the term of this patent is extended or adjusted under 35 U.S.C. 154(b) by 0 days.

(21) Appl. No.: 17/270,002

(22) PCT Filed: Aug. 30, 2019

(86) PCT No.: PCT/SE2019/050815

§ 371 (c)(1),
(2) Date: Feb. 20, 2021

(87) PCT Pub. No.: WO2020/050765

PCT Pub. Date: Mar. 12, 2020

(65) Prior Publication Data

US 2021/0180555 A1 Jun. 17, 2021

(30) Foreign Application Priority Data

Sep. 4, 2018 (SE) .................................... 1851043-8

(51) Int. Cl.
*F02P 9/00* (2006.01)
*F02P 3/04* (2006.01)
(Continued)

(52) U.S. Cl.
CPC ............. *F02P 9/005* (2013.01); *F02P 3/0435* (2013.01); *F02P 3/053* (2013.01); *F02P 3/055* (2013.01);
(Continued)

(58) Field of Classification Search
CPC .......... F02P 9/005; F02P 3/0435; F02P 3/053; F02P 3/055; F02P 3/0838; F02P 3/05; F02P 5/145; F02P 2017/125
See application file for complete search history.

(56) References Cited

U.S. PATENT DOCUMENTS 3,581,720 A * 6/1971 Hemphill ................ F02P 9/005 123/335
3,906,919 A 9/1975 Asik et al.
(Continued)

FOREIGN PATENT DOCUMENTS

CN 102518514 A 6/2012
EP 0566335 A2 10/1993
EP 1577545 A1 9/2005

OTHER PUBLICATIONS

Search report for related application PCT/SE2019/050815 issued Sep. 20, 2019.
(Continued)

*Primary Examiner* — Phutthiwat Wongwian
*Assistant Examiner* — Sherman D Manley
(74) *Attorney, Agent, or Firm* — Schott, P.C.

(57) ABSTRACT

The invention relates to an improved ignition system for spark ignited combustion engines. According to the invention the voltage over a coil winding 6P on the primary side of the ignition coil is regulated to a sufficiently low voltage level during timed periods of the ignition cycle, such that at least one function out of three in total, i.e. prevention of premature spark-on-make, or spark suppression after onset of ignition, or improved frequency response between primary and secondary side of the ignition coil after end of ignition, is obtained. When applied in an inductive ignition system a differential amplifier (8) may be connected over the primary winding 6P regulating a control switch 2CS via a drive unit (9). The invention is preferably implemented in
(Continued)

ignition systems with ion sense circuitry 5C,5R on the secondary side of the ignition coil, and implementing all three functions.

21 Claims, 5 Drawing Sheets

(51) Int. Cl.
*F02P 3/05* (2006.01)
*F02P 3/055* (2006.01)
*F02P 5/145* (2006.01)
*F02P 17/12* (2006.01)

(52) U.S. Cl.
CPC ......... *F02P 5/145* (2013.01); *F02P 2017/125* (2013.01)

(56) References Cited

U.S. PATENT DOCUMENTS

| | | | | | |
|---|---|---|---|---|---|
| 4,064,415 | A * | 12/1977 | Blackington | F02P 3/0435 315/209 T |
| 4,894,602 | A * | 1/1990 | Davis | F02P 9/005 322/38 |
| 5,309,888 | A * | 5/1994 | Deutsch | F02P 3/0554 123/644 |
| 6,075,366 | A * | 6/2000 | Yasuda | F02P 3/093 73/35.08 |
| 6,408,242 | B1 * | 6/2002 | Tozzi | F02D 35/021 324/399 |
| 6,450,157 | B1 | 9/2002 | Kesler et al. | |
| 7,293,554 | B2 | 11/2007 | Moran et al. | |
| 7,778,002 | B2 | 8/2010 | Skinner et al. | |
| 2005/0178372 | A1 * | 8/2005 | Kesler | G01K 7/01 374/E7.035 |
| 2006/0152865 | A1 | 7/2006 | Nair et al. | |
| 2008/0012041 | A1 | 1/2008 | Kesler | |
| 2008/0127937 | A1 * | 6/2008 | Toriyama | F02P 9/007 123/406.12 |
| 2013/0206106 | A1 * | 8/2013 | Huberts | F02P 17/12 123/406.27 |
| 2016/0084215 | A1 * | 3/2016 | Kondou | F02P 15/10 123/620 |
| 2016/0134085 | A1 | 5/2016 | Obe et al. | |
| 2016/0222939 | A1 | 8/2016 | Tang et al. | |
| 2018/0017033 | A1 | 1/2018 | Miyazawa | |
| 2018/0038338 | A1 * | 2/2018 | Sugiura | F02P 3/0435 |
| 2018/0156182 | A1 * | 6/2018 | Hattori | F02D 41/1454 |
| 2018/0202411 | A1 | 7/2018 | Silva et al. | |
| 2018/0223790 | A1 * | 8/2018 | Takeda | F02P 3/00 |
| 2018/0291861 | A1 * | 10/2018 | Hagari | F02P 5/145 |
| 2019/0293042 | A1 * | 9/2019 | Wakasugi | F02P 13/00 |
| 2019/0331083 | A1 * | 10/2019 | Nakamura | G01L 23/225 |
| 2019/0360448 | A1 * | 11/2019 | Kita | H03K 17/567 |

OTHER PUBLICATIONS

European Search Report issued in the EP Patent Application No. 19856715.8, Sep. 13, 2022, 8 pages.
"Communication pursuant to Article 94(3) EPC", issued by the European Patent Office for European Application No. 19 856 715.8 on May 16, 2024, 5 pages.

* cited by examiner

IGNITION SYSTEM AND METHOD CONTROLLING SPARK IGNITED COMBUSTION ENGINES

BACKGROUND OF THE INVENTION

Several features need to be controlled in ignition systems for spark ignited combustion engines. This applies to both capacitive discharge and inductive discharge ignition systems.

One such feature is control of a spontaneous spark during dwell, i.e. when the supply voltage is connected to a primary ignition coil. If the current surge, i.e. di/dt, through the primary winding becomes excessive a premature spark may be generated in the spark plug, resulting in an onset of the combustion too early and loss of performance. Another related feature to this is the need to reduce the power consumption, i.e. draining the battery, where the induced ignition voltage is limited to a level sufficient for a successful spark in the spark plug gap.

Another feature is the possibility of ending the spark, once the combustion is initiated, which may reduce wear in spark plug gap.

Yet another feature is the possibility of ion current detection during the combustion, which detection is done by measuring the ionization degree in the combustion chamber. The ion current signal could detect several combustion parameters such as i) successful start of combustion; ii) unfavorable knocking conditions; iii) The pressure peak position; iv) actual A/F ratio in the combustion chamber, and several other parameters that could be of interest for controlling the combustion engine at most favorable combustion conditions including reduction of emissions.

Several solutions have been presented in the prior art for controlling these features.

Current limiter is a frequent circuit used to limit the current trough the primary winding. In conventional systems the primary winding is connected to a voltage source through a power transistor. When the current has reached the necessary level the current is typically restricted which induce a di/dt surge in the ignition coil that may result in a premature spark and/or an oscillation in the circuitry. The current control comes into action once the current has reached the required level.

In U.S. Pat. No. 3,838,672 (GM 1974) a solution is shown with a current limiter, limiting the magnitude of the developed current to a predetermined magnitude to limit the waste of battery power. The voltage over a control impedance element is measured, said control impedance element located in series with a switching transistor across a direct current source. This solution limits the peak current trough said primary winding, but as soon the current is limited then also di/dt is altered and ringing is produced in the ignition coil. This solution also includes alteration of the dwell length.

In U.S. Pat. No. 4,248,200 (Hitachi 1981) a solution is shown for limiting the waste of power, using a current limiter circuit for limiting the current flowing in the ignition coil to a predetermined value. However, when this current is limited, then di/dt is changed and this could cause premature ignition.

In U.S. Pat. No. 4,245,610 (Hitachi 1981) yet a current limiter is presented that prevents the small oscillations caused at the time when a current is limited, because said oscillations may destroy the power transistor. In this circuitry the voltage is proportional to the collector current of a power transistor detected in a position between the primary winding and electrical ground.

In U.S. Pat. No. 4,075,997 (Lucas 1978) a spark ignition system keeping the power transistor in an open conductive state is shown, with an amplifier producing an output signal that is not saturated by oscillatory high frequency spurious signals since these have a low integral. This solution prevents pre-mature sparks.

In U.S. Pat. No. 4,382,431 (Bosch 1983) a circuit for decreasing oscillations in the primary winding of an ignition coil of an internal combustion engine during dwell is shown. A simple resistance in a control circuit prevents further increases of the current through the primary winding of the ignition coil after a predetermined value required for sufficient energy storage for ignition has been reached. The resistance prevents oscillations across the primary winding.

In U.S. Pat. No. 4,912,373 (SGS Thomson 1990) an ignition system that reduces waste of energy during dwell is shown. It includes a bipolar power switch in series with the primary of an ignition coil and a detection resistor associated with a voltage divider supplying a voltage; a controlled amplifier-comparator, the first input of which receives the measured voltage and the second input receives a reference voltage, and the output of which is connected with the base of the switch, this amplifier-comparator acting for limiting the base current when the measured voltage is approaching the reference voltage; a series resistor between the output of the amplifier-comparator and the base of the switch; and a differential amplifier, the inputs of which are connected with the terminals of the series resistor and the output of which is connected with the first input of the amplifier-comparator.

In U.S. Pat. No. 4,913,123 (Ford 1990) is an ignition timing correction disclosed using the back EMF generated in the primary winding of an ignition coil in response to current change in the secondary winding of the ignition coil due to spark breakdown. If the EMF detected spark break down occurs offset from the spark target timing is the dwell timing corrected for subsequent ignitions. This technology uses the concept of detecting prevailing conditions in the secondary winding through EMF effects in primary winding but is only used to correct timing of ignition.

In U.S. Pat. No. 4,977,883 (Mitsubishi 1990) an ignition system is disclosed where the current trough the primary winding is bypassed by a capacitor when the current reaches a prescribed level, while disabling the bypass during cranking. Yet a solution where the primary current is controlled once it reaches the prescribed level but during cranking is the excess current charging the capacitor.

In U.S. Pat. No. 5,139,004 (Delco Electronics 1992) yet another primary current limiter detecting the voltage over a resistor is disclosed. The circuitry is rather complex with locking means for keeping a closed semiconductor closed after it has been turned off.

In U.S. Pat. No. 5,199,407 (Mitsubishi 1993) another current limiter is disclosed using a Darlington circuit between a differential amplifier and the base of the power transistor.

In U.S. Pat. No. 5,392,754 (Delco Electronics 1995) a method for suppressing ringing in an ignition circuitry at start of dwell, i.e. “ignition on make”, is disclosed. The power transistor is made conductive during a short period and the energy/ringing is subsequently dissipated before turning on the power transistor again.

Above solutions have a general applicability in ignition systems without ion sense circuitry, or with ion sense circuitry, where oscillations in the circuitry caused by di/dt changes may cause premature ignition or may cause high frequency signals that may erroneously be interpreted as signals representative for the combustion conditions (as sensed by the ion sense circuitry).

For ignition systems with ion sense circuitry the problem with oscillations in the secondary winding are even more problematic, and it is a fact that spark-on-make diodes are sometimes used in the secondary winding to prevent premature sparks. The use of spark-on-make diodes prohibits conventional ion-current measurement.

In U.S. Pat. No. 6,424,155 (Bosch 2002) as well as in U.S. Pat. No. 6,298,837 (Bosch 2001) ignition systems are disclosed with an extra switch that short-circuits the primary winding during ionization current measurements.

In U.S. Pat. No. 6,779,517 (NGK 2004) an ignition system with an extra switch is disclosed that short circuits the spark-on-make diode during ionization current measurements.

In U.S. Pat. No. 7,778,002 (Delphi Tech 2010) a method and system is disclosed to reduce ring-out in an ignition coil to allow for ion sense processing. In this system an extra control winding is magnetically coupled to the ignition coil, with a diode and resistor connected between the ends of the extra control winding to allow dissipation of energy after the spark event, when ion sensing is activated.

In U.S. Pat. No. 9,429,132 (Hoerbiger Kompressortechnik 2016) a capacitive ignition system with ion-sensing and suppression of AC ringing is disclosed. In this system a diode is connected across the secondary winding such that it is reversed biased for spark current and forward biased for the AC ringing after the spark.

In WO 2016181242 (Eldor Corp. 2016) another electronic ignition system with ion-sensing is disclosed wherein not less than three additional switches are used to control short circuiting of primary coil as well as current peak protection.

The major problems in these prior art solutions for ignition systems with ion sensing are that additional switches are needed increasing costs for the systems as well as reduce system reliability, and most systems use electronic switches that only will stay in short circuiting state as long as the energy in the magnetic circuit is not reaching a low level, which may coincide with later phases of ion sensing and may cause oscillations in the circuitry that affect correct readings from the ion sense signal.

SUMMARY OF THE INVENTION

The objective with the present invention is to enable a better control of the ignition system without the disadvantages known from prior art. In the most general sense, the invention solves the problems with additional switches by instead controlling the conductive state of the power switch such that a sufficiently low voltage is maintained over the control winding, and that this control may be extended in time as it is independent on any remaining energy stored in the magnetic circuit, and instead control the current flowing through the control winding from the voltage supply source of the ignition system. The power switch controlled is preferably the existing power switch, thus avoiding additional switches for the control. The low voltage maintained may preferably be at a constant level during part of the ignition event, but during the ignition event the low voltage may also be controlled at different voltage levels, all preferably lower than the voltage supply level.

In the general embodiment of the invention an ignition system for spark ignited combustion engines is provided, comprising a control winding and a secondary winding of an ignition coil magnetically coupled to each other; the secondary winding of the ignition coil having a first terminal connected to a spark plug and wherein the control winding is connected to a control system with at least one predetermined voltage interval reference, wherein the control system controls the voltage across said control winding within the predetermined voltage interval reference such that the impedance of the secondary winding of the ignition coil is influenced. By in situ measurement of the voltage over the control winding and control the same, a better control of the dwell cycle can be obtained, hereby preventing extended ringing when the ignition spark is extinguished. Measuring the voltage over the control winding makes the control insensitive to changes in the supply voltage source, as the voltage source per se may be subjected to voltage peaks occurring randomly in the electrical system. Most often there are requirements that the ignition system must prevent premature sparks even if peak voltages up to 40-50 volt may occur in electrical systems with 12 volt battery supply. If a peak voltage of 40-50 volts is applied on the primary side, this may result, depending on turn-over ratio, in secondary voltages well above the level for creating a spark in the spark plug. Controlling the voltage over the control winding may assure a controlled primary current surge with low di/dt value, thus limiting risks for premature sparks. The very same voltage control may also be used to control an AC short circuit over the control winding, transforming the short circuit also to the secondary winding, at will in a timed manner during an ignition event.

In a preferred embodiment the ignition system for spark ignited combustion engines further comprises

- a supply voltage source supplying a nominal voltage level to the ignition system;
- a control switch arranged in series with the control winding controlling the flow of current through the control winding from the supply voltage source;
- a voltage measuring circuit connected over the control winding for measuring the voltage applied over the control winding;
- a voltage control circuit connected to the voltage measuring circuit and in response to the measured voltage controls the conductive state of the control switch maintaining the measured voltage applied over the control winding below a predetermined voltage level lower than the nominal voltage level of the supply voltage source (1) during at least a part of the ignition event. This kind of control system guarantees that the voltage over the control winding never exceeds that of the supply voltage source, and that occasional voltage peaks in the supply voltage could not cause unintentional premature sparks during dwell. The control system could also limit the voltage at a suitable low level, more or less short circuiting the control winding, when the spark is to be extinguished. This also improve high frequency transfer in ion sense signal.

In yet a preferred embodiment of the invention the ignition system is equipped with ion sense functionality with the secondary winding of the ignition coil having a first terminal connected to a spark plug and with an ion sense measuring circuit connected to a second terminal of the secondary winding of the ignition coil said ion sense circuit including a capacitance applying a measuring voltage over the spark plug after having been charged by the spark current and a measurement resistance. In such systems it is of utmost importance to be able to shorten the spark duration without causing ringing in the system or advancing the ringing in relation to the measurement phase, thus increasing the measuring window for ion current detection over the spark plug gap.

Further in another preferred embodiment, in ignition system for spark ignited combustion engines with ion sense functionality the invention has an ignition coil with a primary winding, control winding and a secondary winding magnetically coupled to each other, and with the primary winding connected to a supply voltage source for providing the energy for a spark event and with the secondary winding having a first terminal connected to a spark plug so that a secondary voltage across the secondary winding is applied to the spark gap of the spark plug. The ion sense measuring circuit is connected to a second terminal of the secondary winding including a bias voltage source providing a biasing voltage to the spark gap after the spark event for ion-sensing. The control system including a voltage measuring circuit connected over the control winding for measuring the voltage applied over the control winding, and a voltage control circuit connected to the voltage measuring circuit and in response to the measured voltage controls the conductive state of a control switch arranged in series with the control winding controlling the flow of current through the control winding such that the measured voltage over the control winding is maintained within at least one predetermined voltage interval reference, i.e. the measured voltage is kept constant, or substantially constant, and below a voltage threshold level lower than the nominal supply voltage level under at least a part of the charge phase or the spark phase or during the following combustion. This means that the measured voltage is maintained below the voltage threshold level during at least a part of one or more of the charge phase, spark phase and the combustion phase.

Thus, the invention may be implemented with restricted functionality to only one or two out of these three functional modes, but preferably all three of these functional modes. In the best mode the system would be installed in ignition systems with ion sense circuitry in the secondary side of the ignition coil, implementing all three functional modes, i.e. preventing spark-on-make without using a spark-on-make diode; suppressing the spark will increase the undisturbed measuring window for ion sense measurements, and maintaining the control after spark suppression will increase the high frequency content in the ion current signal during combustion.

When implemented in an inductive ignition system the inventive concept in an ignition system for spark ignited combustion engines with ion sense functionality could use a set up where the control winding and the primary winding of the ignition coil is one and the same winding. In this application no extra coil winding needs to be installed keeping costs down for the ignition system. In this system the primary winding is connected to the supply voltage in one terminal end. The other terminal end of the primary winding is connected to a switch.

When implemented in a capacitive ignition system with ion sense functionality, the inventive concept could use a setup where the control winding and the primary winding of the ignition coil are two separated windings.

In this system the primary winding is in one terminal end connected to the supply voltage source via a capacitive charge and discharge circuit, including at least one independent coil winding and a capacitance in the capacitive charge and discharge circuit. Hence, the inventive concept may be implemented in both inductive ignition systems and capacitive ignition systems, but for the latter with an extra coil winding.

The windings of the ignition coil are magnetically coupled to each other. The higher the coupling, the better the short-circuiting effect of the control winding.

The inventive ignition system is used in a completely new way of operation of an ignition system. The inventive method for controlling an ignition system for spark ignited combustion engines, is operated in the following manner:

Measuring the voltage applied over a control winding magnetically coupled to a secondary winding of an ignition coil, Controlling the voltage over the control winding during at least a part of the charge phase, or the end of the spark phase or at least during the subsequent combustion following end of spark;

During control of the voltage over the control winding while keeping the voltage over the control winding within at least one predetermined voltage interval reference such that the impedance of the secondary winding of the ignition coil is influenced. This is the basic control features implemented, and the voltage over the control winding may be controlled not exceeding a predetermined voltage level during charge phase, and/or end of spark phase and/or during the following subsequent combustion. Expressed somewhat differently, the voltage over the control winding may be controlled during at least a part of one of charge phase, spark phase and combustion (or combustion phase).

In some examples of the ignition system for spark ignited combustion engines, the voltage measuring circuit (8) may control, i.e. may be configured for control, the conductive state of the control switch (2CS) maintaining the measured voltage applied over the control winding below a predetermined voltage level lower than the nominal voltage level of the supply voltage source (1) during the charge phase, the spark phase and during the following combustion.

Further, the inventive method for controlling an ignition system for spark ignited combustion engines may involve that an ion sense signal is measured in the circuit of the secondary winding representative for ionization degree in a spark plug gap connected to the secondary winding. In these ignition systems an undisturbed measuring window that includes the major part of combustion is desired. Regulating the voltage level over the control winding at sufficient low level may extinguish the spark at will, thus advancing the undisturbed part of the ionization signal as well as increasing the high frequency content in the ion current signal.

In a preferred implementation of the inventive method for controlling an ignition system for spark ignited combustion engines the voltage over the control winding is kept within at least one predetermined voltage interval reference, i.e. the measured voltage is kept constant, or substantially constant, and below a voltage threshold level lower than the nominal supply voltage level during at least a part of the charge or spark phase or during the following combustion. The inventive method may thus be used during several phases of the ignition event, obtaining multiple effect.

In one implementation the voltage is regulated over the control winding during at least a part of the charge phase; and during the control the voltage over the control winding is kept below at least one threshold level selected below the nominal supply voltage level, safeguarding from pre-mature sparks during charging of the primary winding without use of spark-on-make diodes in the secondary circuit. As an example, the voltage over the control winding may be kept constant, or substantially constant, at a voltage level below said at least one threshold level selected below the nominal supply voltage level, referred to as "selected threshold level". The conventional spark-on-make diode may thus be omitted and replaced by voltage control over the primary coil. The selected threshold level is preferably corresponding to a voltage level in the range 0.5-84% of the nominal supply voltage level, i.e. with a 12-volt battery as supply voltage source a voltage level in the range 0.01-10 volts. Most often the charge phase (i.e. dwell phase) is kept as short as possible, without causing premature sparks. Therefore, the selected threshold level may be closer to 10V instead of 12V, resulting in a lower di/dt through the control winding, thus keeping the total dwell phase longer, compared to 12V supply.

In a second implementation the voltage over the control winding is regulated during the end of the spark phase; and during regulation the voltage over the control winding is kept below at least one threshold level selected below the nominal supply voltage level, ending the spark at onset of said regulation. This may mean that the voltage over the control winding may be kept constant, or substantially constant, at a voltage level below the nominal supply voltage level. This short-circuits the ignition coil and an effective spark suppression is implemented. The selected threshold level corresponds to a voltage level in the range 0.1-30% of the nominal supply voltage level, i.e. with a 12-volt battery as supply voltage source a voltage level in the range 0.01-3.6 volts. Most often spark suppression is implemented in practice with a selected threshold level closer to about 2 volts, which results in sufficient short-circuiting.

In a third implementation the voltage over the control winding is regulated during a subsequent combustion following end of spark discharge; and during regulation the voltage over the control winding is kept below the nominal supply voltage level, improving the ion sense capabilities and especially detection of high frequency content in the ion sense system. Again, the voltage over the control winding may be kept constant, or substantially constant, at a voltage level below the nominal supply voltage level. The selected threshold level corresponds to a voltage level in the range 0.1-30% of the nominal supply voltage level, i.e. with a 12-volt battery as supply voltage source a voltage level in the range 0.01-3.6 volts, whereby the selected threshold level may be closer to about 2 volts. Preferably may the selected threshold level be the same in the second and third implementation.

The invention may preferably be implemented in electronic ignition systems with mapped ignition timing stored in a memory dependent of at least speed, load and temperature in a conventional manner. I.e. the start and ending of the dwell time is set in the memory as a delay time after the reception of the crankshaft signal, and where the start and end of regulation in the first, second and third implementation in the very same manner is stored in the memory.

Finally, the inventive method is used for controlling an ignition system for a spark ignited combustion engine comprising a control winding and a secondary winding of an ignition coil magnetically coupled to each other, the secondary winding of the ignition coil having a first terminal connected to a spark plug. According to the novel aspects of control an electronic switch is selected from the group of switches including IGBT, FET, MOSFET and bipolar transistors, all having a linear region or approximately linear region in the transfer characteristics where the switch may be controlled according to the invention.

This electronic switch is connected in series with the control winding, and the conductivity of said electronic switch is regulated in the linear region such that the voltage over the control winding is maintained at a sufficiently low voltage level below the nominal supply voltage level under at least a part of the charge phase or the spark phase or during the following combustion. In more detail, the voltage over the control winding may in this manner be kept constant, or substantially constant, at a voltage level below the nominal supply voltage level. This is an entirely new concept of AC short circuiting the ignition coil compared to prior art, where prior art only toggles the short-circuiting switches between a conductive and non-conductive state. Prior art most often requires additional ignition current switches and limited by the amount of energy stored in the ignition coil.

The inventive method for controlling an ignition system (TS) may regulate, or control, the conductivity of said electronic switch in the linear region such that the voltage over the control winding is maintained at a constant voltage level below the nominal supply voltage level during at least a part of the charge phase, the spark phase and the combustion phase.

DETAILED DESCRIPTION OF CONVENTIONAL IGNITION SYSTEMS

In the following description the following terminology is used:

Supply voltage source; represents the voltage source that provides the voltage source for the ignition system, and this supply voltage source may preferably be a battery, or alternatively generator windings driven by the engine in battery less engines. Most often a 12-volt supply voltage source in form of a battery is used, but other voltage sources may be used such as generators in hand-held engines.

Power switch; represents the switch that connects the supply voltage source to ground via the primary winding of the ignition coil in typical inductive ignition systems or the inductor in capacitive ignition systems. In embodiments shown in drawings of preferred embodiments semiconductor switches are used for the power switch, but it should be clear that any kind of power switch may be used, unless the power switch and the control switch is one and the same switch as implemented in inductive ignition systems.

Control switch; represents the switch that is controlled during the ignition event in order to regulate the voltage over the control winding. This switch may preferably be located between one end of the control winding coil and electrical ground but may also be located between the other end of the control winding coil and the supply voltage terminal. In the simplest implementation in an inductive discharge ignition system the Power switch and the control switch may preferably be one and the same switch.

Inductive Discharge Ignition (IDI) system

Figure 1:
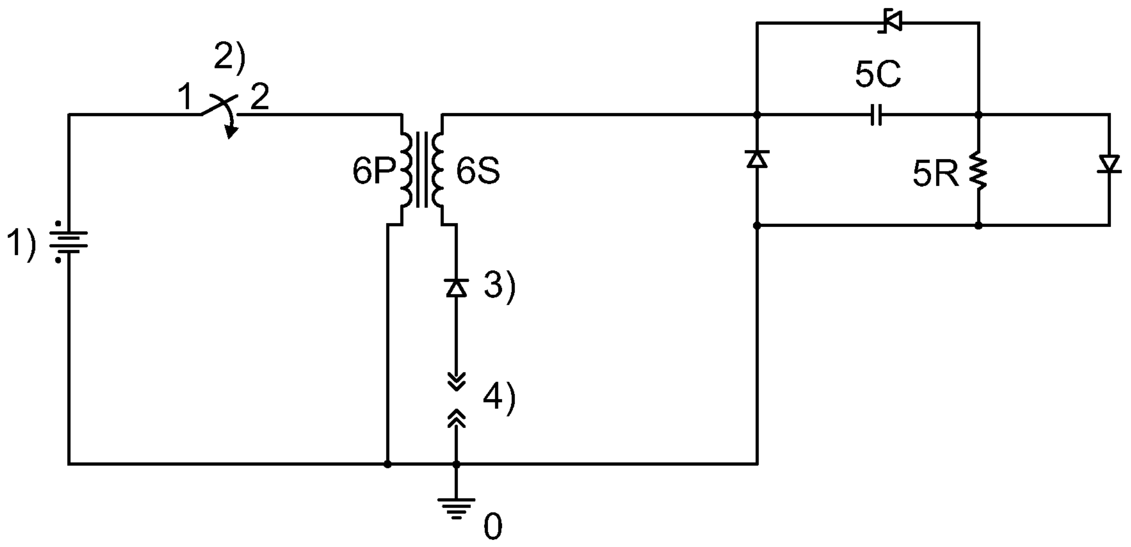
Fig. 1 Prior art
FIG. 1; Show the circuitry of a conventional Inductive Discharge Ignition (IDI) system, a spark-on-make diode, and an ion current detection circuit; Together, spark-on-make diode and conventional ion current detection circuit will not function properly. The capacitor 5C is normally charged during spark events. This will work as drawn in FIG. 1. After the spark have extinguished, the capacitor 5C is meant to pull a small current from the capacitor 5C to ground, through the spark gap 4. The spark-on-make diode would stop this ion current to flow in that direction.

In FIG. 1 a conventional IDI system is disclosed. The IDI system works in two phases—charge and spark phase. First, energy is stored as magnetic flux in the ignition coil 6 core in the 'charge phase'. This energy is then released in the spark plug gap 4 in the 'spark phase'.

During the spark phase a capacitance 5*c* can be charged. After the spark phase the capacitance 5*c* can be discharged in order to measure an ion current through the spark gap. This current is measured over the measurement resistance 5*r* and can be extracted as an ion current signal IS. The current flows through the secondary winding 6S, which lowpass filters the current, reducing the bandwidth of the signal IS measured in 5*r*. The secondary winding has a large inductance, and therefore a large impedance for high frequency signals. This implies that information in the upper end of the frequency spectrum is lost.

Spark-on-make diode 3 is sometimes used to prevent involuntary spark discharge during charge phase. With a low turnover ratio, or a low supply voltage, this may not be needed. The induced voltage on the secondary side during charge phase is determined by the supply voltage and the ignition coil turnover ratio. Most often a functional requirement is applied that the ignition system shall not induce a spark during charge, even if the supply voltage may reach 40-50 volt in a 12V battery system. These higher voltages may occur occasionally, and this is the reason why spark-on-make diodes are required, and thus why conventional ion current detection circuitry is not feasible in conventional IDI systems.

Note that the proposed invention does not need spark-on-make diode to prevent sparks during charge and can still use a conventional ion current detection circuit.

In conventional IDI systems the spark typically last as long as there is enough energy in the ignition coil 6 to maintain the spark. When the spark is extinguished, there will be a non-negligible amount of residual energy left in the coil. This residual energy causes ringing in the measured ion current signal IS. Moreover, when there is not enough energy to maintain a persistent spark, the energy could still cause restrikes, which have an impact on the spark plug wear. By suppressing the spark at a given time instance, the number of restrikes can be minimized, and thus spark plug life prolonged.

To have control of the spark duration, to control ignite ability, spark plug wear and ion current ringing, it is necessary to have the possibility to turn the spark off, i.e., "spark suppression".

The residual energy in the coil may be reduced if the control winding is short circuited by using a switch (not shown) in parallel to the control winding 6P. Using such a switch a low impedance can be achieved on the primary side, which transformed to the secondary side, will lower the impedance on the secondary side. Thus, improving the frequency response. However, switches used in this manner are not always forward biased and are therefore not working in their linear operating range. For either small or negative currents, the switch is not conducting very well.

A switch, as described above, used as a short circuit device will not be forward biased when the magnetic energy stored in the ignition coil runs out. Therefore, such a switch would only conduct current as long as the ignition coil is charged enough.

Another drawback with this solution is that the residual magnetic energy in the core is limited. This means that once the core is out of magnetic energy, the coil can no longer drive a current through the switch, and therefore the switch stops acting as a short circuit over the primary, and the frequency response goes back to normal. Furthermore, by turning the semiconductor switch off transients will be introduced in the ion current. Using a semiconductor switch over the primary winding results in practical limitations or drawbacks such as inability of conducting current in both directions. A semiconductor switch is not a linear component. This implies that when the current through the component goes toward zero, transients will be introduced on the secondary side.

Capacitive Discharge Ignition (CDI) system

Figure 2:
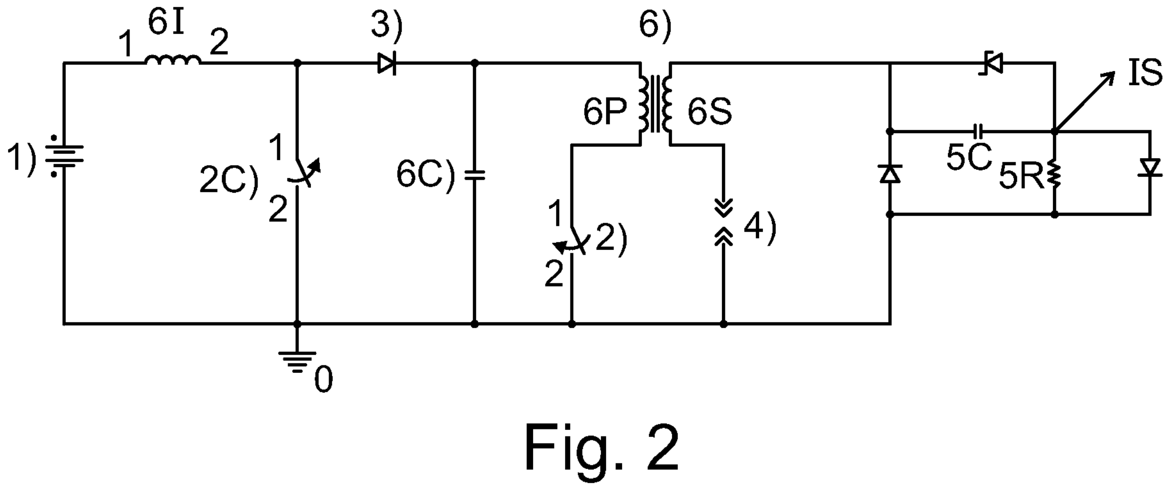
Fig. 2 Prior art
FIG. 2; Show the circuitry of a conventional Capacitive Discharge Ignition (CDI) system.

In FIG. 2 a conventional CDI system is disclosed. In conventional CDI systems an inductor 61 is charged by closing a charge switch 2C. The charged energy in the inductor 61 is then discharged into a charge capacitor 6C when the charge switch 2C open the current path to ground. The charge capacitor 6C can then be discharged, at will, into the ignition coil 6, using a power switch 2.

Conventional CDI systems do not easily allow spark suppression. The power switch indicated in 2, typically a Triac switch, has practical limitations that do not allow for opening the primary circuit at will.

In conventional CDI systems the spark duration is typically controlled by changing the energy stored in the charge capacitor 6C.

DETAILED DESCRIPTION OF PREFERRED EMBODIMENTS

Inductive Discharge Ignition (IDI) System

Figure 3:
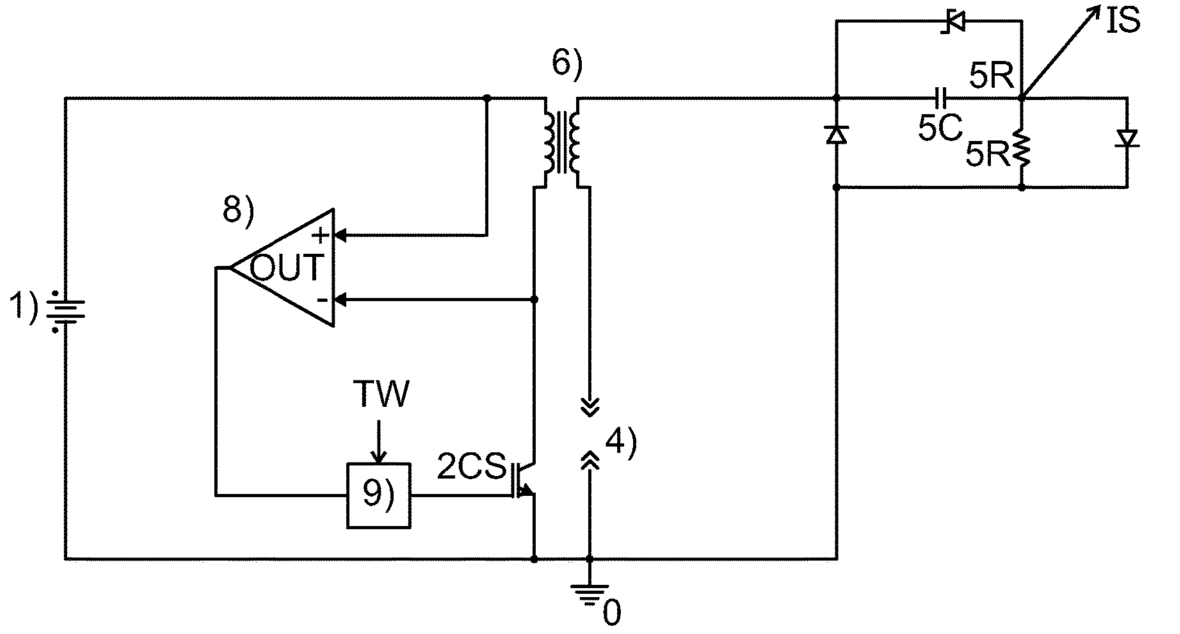
FIG. 3; Show the circuitry of the inventive concept applied in an IDI system.

In FIG. 3 an improved IDI system according to the invention is disclosed. This circuit is equipped with primary voltage regulation, that maintains the voltage over the control winding 6P at a selected steady low voltage. What is added in comparison to FIG. 1 is a differential amplifier 8, a driver unit 9 and a control switch 2CS, the differential amplifier 8 is connected over the ends of the control winding 6P and the output signal is connected to the driver unit 9 that controls the conductive state of the control switch 2CS. The control of the conductive state is regulated preferably within the linear region when using an IGBT or MOSFET switch or any similar switch with a linear transition region.

By regulating the voltage across the control winding during the charge phase, it is possible to limit the generated voltage on the secondary during the charge phase, and thereby eliminate the need of the spark-on-make diode 3 (see FIG. 1) used in conventional systems. In other words, by securing a low enough supply voltage over the control winding, the secondary voltage during charge phase can be controlled such that involuntary sparks do not occur.

Spark suppression is achieved with the same switch 2CS, and by controlling a low voltage across the control winding at the end of the spark phase. The spark suppression allows for turning the spark off by reducing the secondary voltage, by introducing the low voltage on the primary, which is transformed to the secondary. By controlling a low enough voltage on the control winding, the secondary voltage can be reduced enough to no longer reach the spark gap breakdown voltage required to create, or maintain a persistent, spark.

In order to increase the information from the measured ion current, which is done directly after the spark suppression, it is desirable to lower the impedance for higher frequency signals. This can be achieved by the inventive feedback loop, feedback gain control and switch, as shown in FIG. 3. That is, the inventive feedback loop may preferably be a closed loop control. The driver unit 9 have control signals TW as input, which control when in time to activate or deactivate the voltage regulating, and what voltage levels to regulate.

By letting the feedback control the control switch 2CS it is possible to regulate a constant voltage across the control winding 6P, thus creating an AC short circuit, over the primary. Transformed to the secondary side this will reduce the impedance acting on the ion current. Thereby increasing the frequency response on the secondary side, which in turn will allow for higher frequencies to be measured in 5R.

Figure 5:
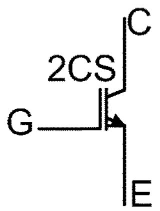
FIG. 5; Show the switch to be controlled according to the invention.
Figure 6A:
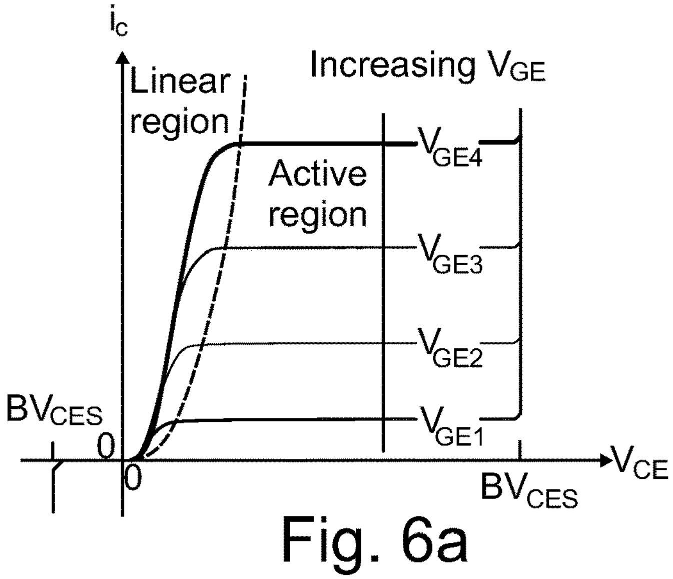
FIG. 6*a*; Show the control region for the switch, in this case the characteristics of an IGBT switch.

The switch 2CS used to control the conductivity is in principle shown in FIG. 5, and here an example with an IGBT switch with a Gate G, Collector C and Emitter E. However, it must be understood that other type of switches may be used such as FET-, MOSFET or Bipolar transistor switches having a linear or approximately linear region where the conductivity of the switch may be regulated The transfer characteristics of a conventional IGBT switch is shown in FIG. 6*a*, with the linear region shown on the left-hand side of the dashed line.

Figure 6B:
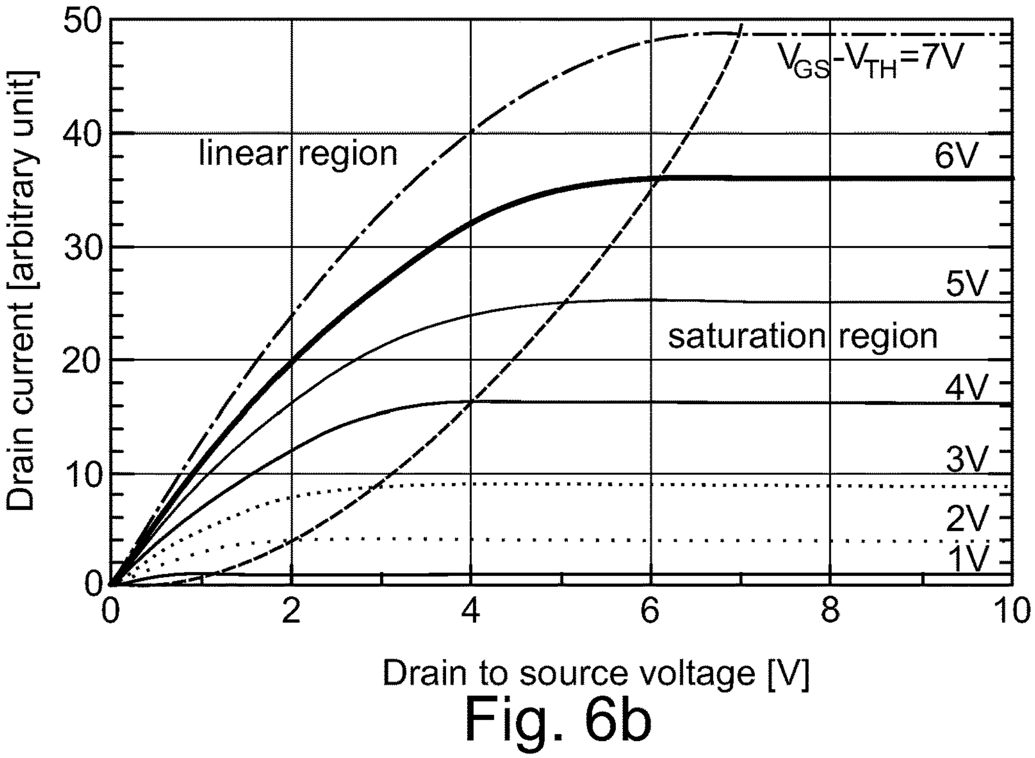
FIG. 6*b*; Show the control region for an alternative switch, in this case the characteristics of an MOSFET switch.

Similar transfer characteristics of a conventional MOSFET switch is shown in FIG. 6B, with the linear region is shown on the left-hand side of the dashed line.

Basically, the voltage regulation works as follows. The differential amplifier 8 in FIG. 3 or 4 measures the voltage over the control winding, 6P or 6E, and amplifies the voltage about 1/10. The output signal is sent to the driver unit 9 which compares the output with a setpoint value that preferably is obtained as a reference signal TW. The driver unit 9, for example a PID regulator, is controlling the switch 2CS.

Figure 7:
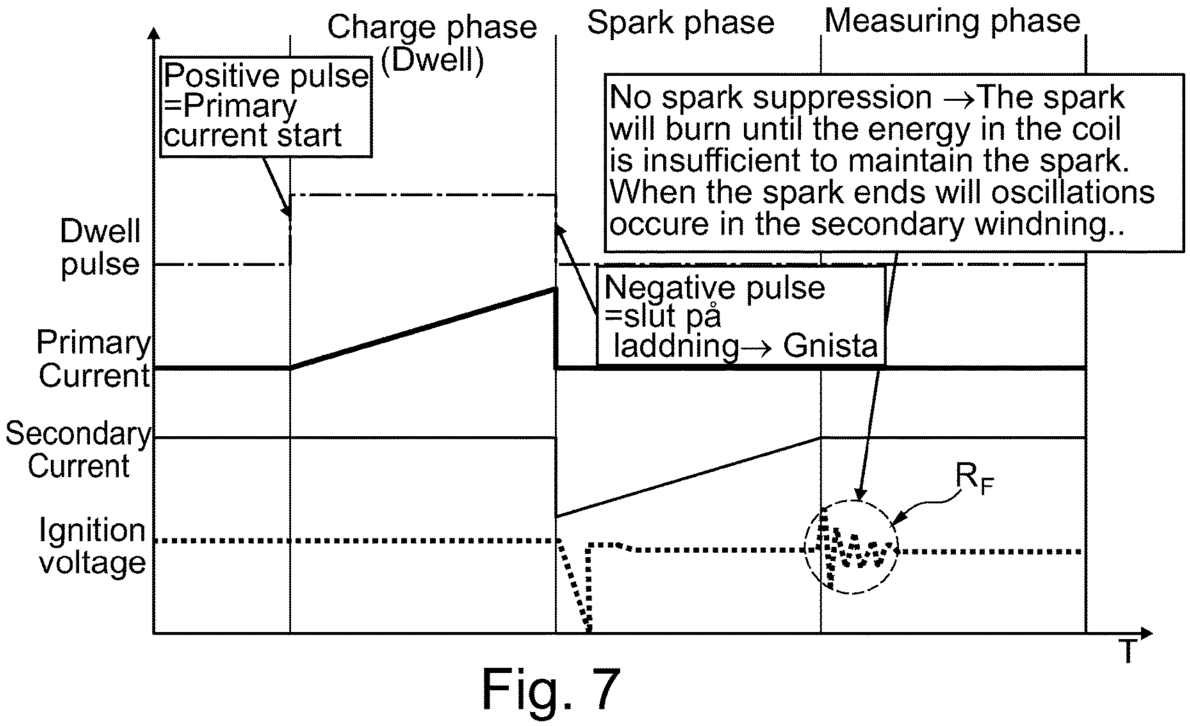
FIG. 7; Show the output signals in wave form diagrams during an ignition event using conventional ignition circuitry.
Figure 8:
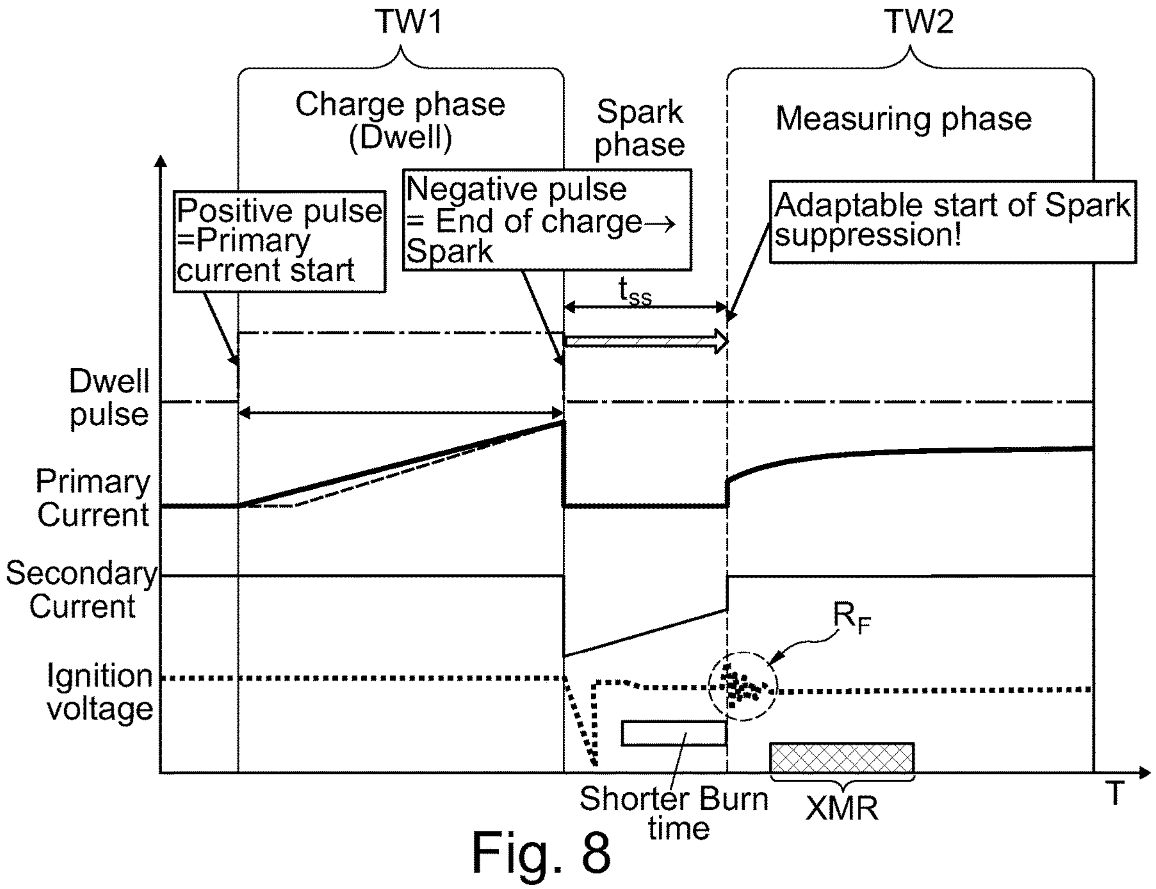
FIG. 8; Show the output signals in wave form diagrams during an ignition event using the inventive ignition circuitry.

The effect of the inventive ignition system is shown in FIG. 8 with a comparative FIG. 7 using conventional ignition system circuitry. In these figures are the state of the dwell pulse, the primary current, the secondary current and the ignition voltage shown in wave form diagrams during an ignition event during the time T.

As seen in FIG. 7, the dwell pulse, i.e. the positive flank, is starting the current through the control winding and thus starts the charge phase. The primary current starts to flow and increases at constant rate. At negative flank of the dwell pulse, the primary current is cut off. This generates a high primary voltage, which in turn gives a high secondary voltage. Given that the secondary voltage exceeds the breakdown voltage of the spark gap, a spark will be generated.

The secondary current declines at constant rate during the spark phase and when the energy in the secondary coil is insufficient to maintain the spark, the spark will be extinguished. However, a residual amount of energy will still be left in the magnetic circuit, and this causes an oscillating ringing as seen in the window RF in FIG. 7.

Turning now to FIG. 8, are the effects of the invention shown. The effect of voltage regulation over the control winding to a sufficiently low level may be used during the charge phase. If a 12-volt battery is used as supply voltage source the regulated voltage may be kept at 10 volts as an example, depending on turn-over ratio. The controlled voltage level should be chosen such that it will prevent spark on make and prevent premature sparks. This results in a slightly lower primary current increase, i.e. a lower di/dt value, as indicated in FIG. 8 with a curve that need to be started a bit ahead of conventional charge phase (the dashed line could be the current if 12 volts is applied instead of 10 volts). Thus, a spark during charge is mitigated by the voltage control, and a need for a spark-on-make diode is avoided.

The effect of voltage regulation over the control winding to a sufficiently low level may be used to suppress the spark, i.e. extinguish the spark before the energy in the secondary is fully exhausted. The total time for the spark may be set in the ignition system to a time period indicated by $t_{SS}$ in FIG. 6. The voltage level to be controlled may be the same level as that applied during charge phase, but preferably the voltage level may be considerably lower during spark suppression. If a 12-volt battery is used as supply voltage source the regulated voltage may be kept at 0.01-3.6 volts. In order to fully extinguish the spark the controlled voltage may be applied during a time exceeding that of the coil ringing as seen in the window RF in FIG. 7.

The effect of voltage regulation over the control winding to a sufficiently low level may be used to increase the frequency response on the secondary side, which in turn will allow for higher frequencies to be measured by ion sense circuitry. The voltage level to be regulated may be the same level as applied during spark suppression, i.e. in a 12 volt system regulated to a voltage kept at 0.001-3.6 volt. Besides increase of frequency response, i.e. capabilities to detect higher frequencies, the entire measuring window will also be extended, without any limits in duration. The order of extension is marked as XMR, Extended Measuring Range, in FIG. 8.

Figure 9:
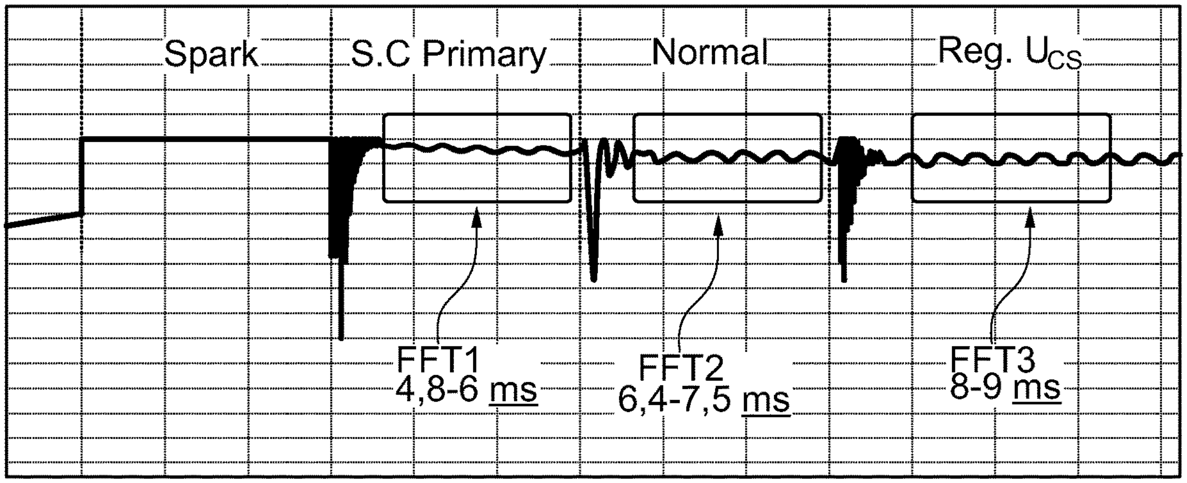
FIG. 9; Show the improved frequency response on the secondary side, allowing higher frequencies to be measured in the ion current detection.

Three different ignition circuits have been tested with respect to frequency response, or bandwidth, in the ion sense signal IS. The frequency response has been tested by applying an electrical disturbance on the secondary side in form of a 10 kHz square wave. It was then measured how much of the disturbance was transferred through the secondary winding. The result is shown in FIG. 9.

The first ignition circuit tested includes a semiconductor switch connected in parallel to the primary, and the IS signal picked up in the secondary circuit is seen as "S.C. Primary". By using this semiconductor switch the control winding may be short circuited at will.

The second ignition circuit tested is a conventional circuit, and the IS signal picked up in the secondary circuit is seen as "Normal".

The third ignition circuit tested includes the inventive voltage regulation over the control winding, and the IS signal picked up in the secondary circuit is seen as "Reg. $U_{CS}$". It is seen here that the frequency response is best when using the inventive circuitry because most of the disturbance signal, the square wave, is present in the IS signal. In other words, the inventive circuitry allows for more frequency content to pass through the secondary side winding. This is beneficial, as a greater bandwidth in the ion sense signal means more information in said signal.

Capacitive Discharge Ignition (CDI) system

Figure 4:
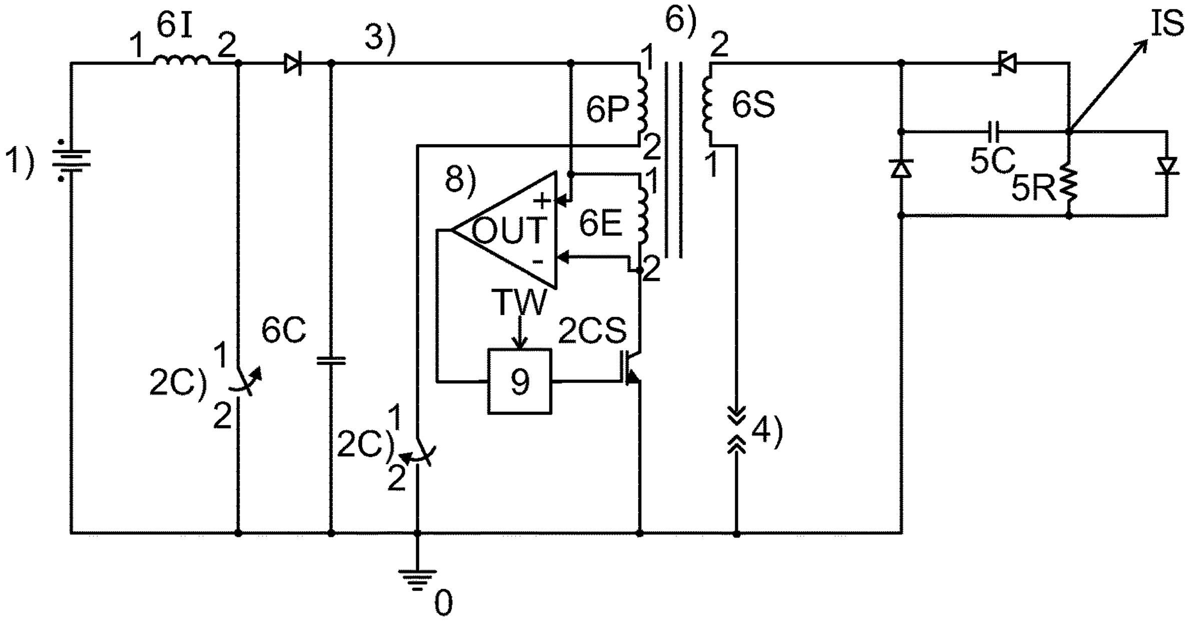
FIG. 4; Show the circuitry of the inventive concept applied in an CDI system.

In FIG. 4 an improved CDI system according to the invention is disclosed. In the case of an CDI system, it is also desirable to increase the frequency content of the measured ion current. This can be achieved by introducing a third winding 6E magnetically coupled to the secondary winding. This extra winding 6E can then be controlled according to the invention to achieve spark suppression, and to increase the frequency content of the ion current signal IS in the same manner as for the inventive IDI system.

By utilizing a differential amplifier, a driver unit 9 and a control switch 2CS it is possible to control the voltage across the control winding, thus creating an AC short circuit.

After the spark phase, spark suppression may be achieved with the same switch 2CS, and by controlling a low voltage across the control winding. The spark suppression allows for turning the spark off by reducing the secondary voltage, by introducing the low voltage on the primary, which is transformed to the secondary. By controlling a low enough voltage, the secondary voltage can be reduced enough to no longer reach the spark gap breakdown voltage required to create a spark. During the subsequent measuring phase the voltage regulation may continue in the same manner as disclosed for the IDI system, which transformed to the secondary side will reduce the impedance acting on the ion current signal IS. Hereby increasing the frequency response bandwidth on the secondary side, which in turn will allow for higher frequencies to be measured in the ion current signal IS as measured over the measuring resistance 5R.

System Layout

Figure 10:
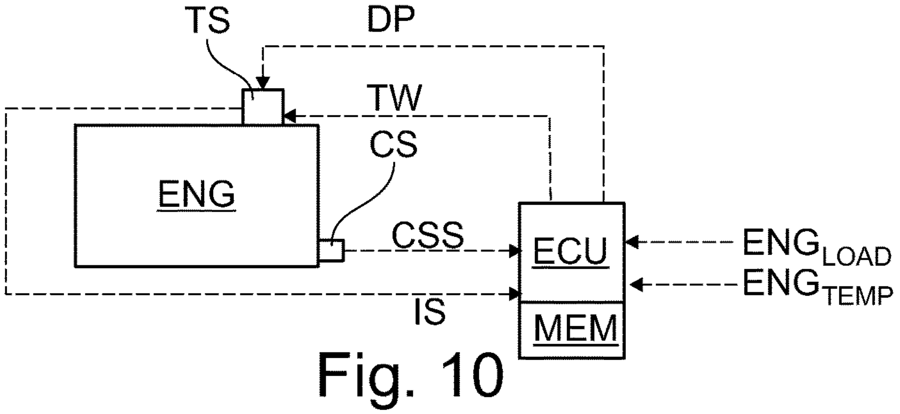
FIG. 10; Show the Ignition system layout with an ignition system mounted on an engine.

In FIG. 10 the Ignition system layout with an ignition system TS including the circuitry of the inventive concept applied in an IDI system or CDI system as shown in FIG. 3 or 4, mounted on an engine ENG is shown. The ignition system may preferably but not necessarily be an electronic ignition system with a central processing unit ECU having ignition maps stored in a memory MEM in a conventional manner. The ECU selects the ignition timing in accordance with mapped ignition timing dependent on at least engine speed, engine load ($ENG_{LoAD}$) and engine temperature ($ENG_{TEMP}$). The engine speed is calculated from the crankshaft signal CSS issued by a crank shaft sensor CS that emits a pulse once per revolution. The onset of charge phase, i.e. dwell phase, is issued in the DP signal sent to the ignition system TS. The synchronized timing of the voltage regulation phases is issued in the TW signal. This kind of electronic ignition system may implement the inventive concept with voltage regulation over the primary winding, where the voltage regulation may be activated with a fixed timing interval after circuit breakers interrupting the current through the power switches.

Timing Chart

Figure 11:
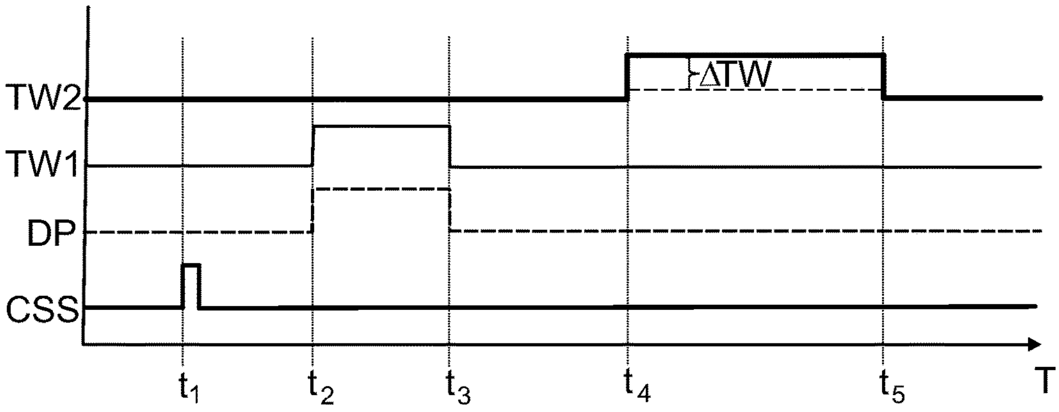
FIG. 11; Show a timing chart for signals used to control the activation of voltage regulation during a spark event.

FIG. 11 shows a timing chart for signals used to control the activation of voltage regulation during a spark event. The lowermost signal show the crankshaft signal CSS issued once per turn of revolution of the crankshaft of the engine. At the time $t_1$ is the positive flank of the crankshaft signal issued and this activates the start of the charge phase at the time $t_2$ when the positive flank of the dwell pulse DP is issued. The delay between the CSS and the DP signal is controlled by the mapped data in the memory MEM dependent on speed, load and temperature. In order to mitigate spark on make is the first voltage regulation phase TW1 started, preferably synchronously. When the spark is to be generated the power switch is turned off by the negative flank of the DP signal at the time $t_3$. At the same time the first voltage regulation phase TW1 is ended, the spark is established and burns in the time interval between $t_3$ and $t_4$. When the ignition spark is to be extinguished, in order to reduce sparkplug wear etc., the second voltage regulation phase TW2 is started at the time $t_4$, which creates a short circuiting of the control winding, obtaining spark suppression. Now, if only the effect of spark suppression is sought for the second voltage regulation phase TW2 may only last for a fraction of the interval disclosed in FIG. 11. In the timing chart diagram in FIG. 11 is the second voltage regulation phase TW2 extended such that it covers the entire effective combustion phase, in which an ionization current in the spark plug gap 4 could generate an ion current signal IS. Typically, the ignition timing is set to 10-24 crankshaft degrees before top dead center, i.e. the ignition advance increasing with engine rpm, and the pressure peak position after onset of combustion is typically occurring some crankshaft degrees after top dead center. To obtain maximum torque the pressure peak position should be located more or less at the same crank shaft angle, which optimum pressure peak position is dependent of engine crankshaft geometry, i.e. type of engine.

It is also indicated in FIG. 11 that the second voltage regulation phase TW2 may set an alternative voltage regulation level with the same signal TW2, but with a somewhat lower amplitude. The difference in amplitude, ΔTW, may be proportional to the voltage level to be regulated, this may be a voltage level of 10 volt during TW1 but a voltage level of 2 volt during TW2. However, other ways of setting the voltage regulation level may be implemented, but alternatively also the same voltage level may be regulated during both of the first and second voltage regulation phases.

The invention claimed is:

1. An ignition system for a spark ignited combustion engine comprising:

a control winding and a secondary winding of an ignition coil magnetically coupled to each other;

the secondary winding of the ignition coil having a first terminal connected to a spark plug;

wherein the control winding is connected to a control system with at least one predetermined voltage interval reference, wherein the control system controls the voltage across said control winding within the predetermined voltage interval reference such that impedance of the secondary winding of the ignition coil is influenced;

a supply voltage source supplying a nominal voltage level to the ignition system;

a control switch arranged in series with the control winding controlling flow of current through the control winding from the supply voltage source; and a voltage measuring circuit is connected over the control winding for measuring the voltage applied over the control winding and that a voltage control circuit is connected to the voltage measuring circuit and in response to the measured voltage controls a conductive state of the control switch in a linear region in transfer characteristics of the switch, maintaining the measured voltage applied over the control winding below a predetermined voltage level lower than the nominal voltage level of the supply voltage source during at least the end of the spark phase or the combustion phase of an ignition event, regulating the voltage over the control winding during a subsequent combustion following end of spark discharge, wherein, during the regulation of the voltage over the control winding, keeping the voltage over the control winding below at least one threshold level selected below a defined supply voltage level, improving ion sense capabilities and detection of high frequency content in an ion current signal during combustion.

2. An ignition system for spark ignited combustion engines according to claim 1, wherein the ignition system has ion sense functionality with the secondary winding of the ignition coil having a first terminal connected to a spark plug and with an ion sense measuring circuit connected to a second terminal of the secondary winding of the ignition coil, said ion sense circuit including a capacitor applying a measuring voltage over the spark plug after having been charged by spark current.

3. An ignition system for spark ignited combustion engines with ion sense functionality according to claim 2, wherein the ignition coil has a primary winding and a secondary winding magnetically coupled to each other, with the primary winding connected to a supply voltage source for providing energy for a spark event and with the secondary winding having a first terminal connected to a spark plug so that a secondary voltage across the secondary winding is applied to a spark gap of the spark plug;

the ion sense measuring circuit is connected to a second terminal of the secondary winding including a bias voltage source providing a biasing voltage to the spark gap after the spark event for ion-sensing;

the control system including a voltage measuring circuit connected over the control winding for measuring the voltage applied over the control winding, and a voltage control circuit connected to the voltage measuring circuit and in response to the measured voltage controls the conductive state of a control switch arranged in series with the control winding controlling the flow of current through the control winding such that the measured voltage over the control winding is maintained within at least one predetermined voltage interval reference and below a voltage threshold level lower than a nominal supply voltage level under at least a part of a charge phase or a spark phase or during the following combustion.

4. An ignition system for spark ignited combustion engines with ion sense functionality according to claim 3, wherein the control winding and the primary winding of the ignition coil is one and the same winding.

5. An ignition system for spark ignited combustion engines with ion sense functionality according to claim 4, wherein the primary winding in one terminal end is connected to supply voltage source.

6. An ignition system for spark ignited combustion engines with ion sense functionality according to claim 3, wherein the control winding and the primary winding of the ignition coil are two separated windings.

7. An ignition system for spark ignited combustion engines with ion sense functionality according to claim 6, wherein the primary winding in one terminal end is connected to supply voltage source via a capacitive charge and discharge circuit, including at least one independent coil winding and a capacitor in the capacitive charge and discharge circuit.

8. An ignition system for spark ignited combustion engines according to claim 1, wherein the control winding and the windings of the ignition coil are magnetically coupled to each other.

9. An ignition system for spark ignited combustion engines according to claim 1, wherein the voltage measuring circuit controls the conductive state of the control switch maintaining the measured voltage applied over the control winding below a predetermined voltage level lower than the nominal voltage level of the supply voltage source during a charge phase, the spark phase and during the following combustion.

10. A method for controlling an ignition system for spark ignited combustion engines, comprising:

measuring a voltage applied over a control winding magnetically coupled to a secondary winding of an ignition coil;

regulating the voltage over the control winding by regulating conductivity of an electronic switch in a linear region in transfer characteristics of the electronic switch during at least a part of a charge phase, an end of a spark phase, or at least during the subsequent combustion following end of spark phase, wherein, during the regulation of the voltage over the control winding, keeping the voltage over the control winding within at least one predetermined voltage interval reference such that impedance of the secondary winding of the ignition coil is influenced; and regulating the voltage over the control winding during a subsequent combustion following end of spark discharge, wherein, during the regulation of the voltage over the control winding, keeping the voltage over the control winding below at least one threshold level selected below a defined supply voltage level, improving ion sense capabilities and detection of high frequency content in an ion current signal during combustion.

11. A method for controlling an ignition system for spark ignited combustion engines according to claim 10, wherein an ion sense signal is measured in a circuit of the secondary winding representative for ionization degree in a spark plug gap connected to the secondary winding.

12. A method for controlling an ignition system for spark ignited combustion engines according to claim 11, characterized in that during regulation of the voltage over the control winding keeping the voltage over the control winding within at least one predetermined voltage interval reference and below a voltage threshold level lower than the nominal supply voltage level under at least a part of the charge phase or the spark phase or during the following combustion.

13. A method according to claim 12, comprising the steps of:

regulating the voltage over the control winding (6P or 6E) during at least a part of the charge phase;

wherein during regulation of the voltage over the control winding keeping the voltage over the control winding below at least one threshold level selected below the nominal supply voltage level, safeguarding from premature sparks during charging of the primary winding without use of spark-on-make diodes in the secondary circuit.

14. A method according to claim 13, wherein the selected threshold level is corresponding to a voltage level in a range 0.5-84% of the nominal supply voltage level, i.e. with a 12-volt battery as supply voltage source a voltage level in a range 0.01-10 volts.

15. A method according to claim 12, comprising the steps of:

regulating the voltage over the control winding during the end of the spark phase;

wherein during regulation of the voltage over the control winding keeping the voltage over the control winding below at least one threshold level selected below the nominal supply voltage level, ending the spark at onset of said regulation.

16. A method according to claim 15, wherein the selected threshold level is corresponding to a voltage level in a range 0.1-30% of the nominal supply voltage level, i.e. with a 12-volt battery as supply voltage source a voltage level in a range 0.01-3.6 volts.

17. A method according to claim 12, comprising the steps of:

regulating the voltage over the control winding during a subsequent combustion following end of spark discharge;

wherein during regulation the voltage over the control winding keeping the voltage over the control winding below at least one threshold level selected below the nominal supply voltage level, improving ion sense capabilities and especially detection of high frequency content in the ion sense system.

18. A method according to claim 17, wherein the selected threshold level is corresponding to a voltage level in a range 0.1-30% of the nominal supply voltage level, i.e. with a 12-volt battery as supply voltage source a voltage level in a range 0.01-3.6 volts.

19. A method for controlling an ignition system for a spark ignited combustion engine comprising:

a control winding and a secondary winding of an ignition coil magnetically coupled to each other, the secondary winding of the ignition coil having a first terminal connected to a spark plug, wherein an electronic switch is selected from a group of switches consisting of: IGBT, PET, MOSFET and bipolar transistors, all having a linear region in transfer characteristics, is connected in series with the control winding, and that conductivity of said electronic switch is regulated in this linear region such that a voltage over the control winding is maintained at a sufficient low voltage level below the nominal supply voltage level under at least a part of a charge phase, or at the end of the spark phase or during a following combustion, regulating the voltage over the control winding during a subsequent combustion following the end of spark discharge, wherein, during the regulation of the voltage over the control winding, keeping the voltage over the control winding below at least one threshold level selected below a defined supply voltage level, improving ion sense capabilities and detection of high frequency content in an ion current signal during combustion.

20. A method for controlling an ignition system according to claim 19, wherein the conductivity of said electronic switch is regulated in this linear region such that the voltage over the control winding is maintained at a constant voltage level below the nominal supply voltage level during at least a part of the charge phase, the spark phase and a combustion phase.

21. A method for controlling an ignition system for spark ignited combustion engines, comprising:

measuring a voltage applied over a control winding magnetically coupled to a secondary winding of an ignition coil, wherein an ion sense signal is measured in a circuit of the secondary winding representative for ionization degree in a spark plug gap connected to the secondary winding;

regulating the voltage over the control winding by regulating conductivity of an electronic switch in a linear region in transfer characteristics of the electronic switch during at least a part of a charge phase, or an end of a spark phase or at least during the subsequent combustion following end of spark phase, during the regulation of the voltage over the control winding keeping the voltage over the control winding within at least one predetermined voltage interval reference such that impedance of the secondary winding of the ignition coil is influenced, wherein, during the regulation of the voltage over the control winding, keeping the voltage over the control winding within at least one predetermined voltage interval reference and below a voltage threshold level lower than a defined supply voltage level under at least a part of the charge phase or the spark phase or during the following combustion; and regulating the voltage over the control winding during a subsequent combustion following end of spark discharge, wherein during regulation of the voltage over the control winding keeping the voltage over the control winding below at least one threshold level selected below the nominal supply voltage level, ending the spark at onset of said regulation.

* * * * *